(12) United States Patent
    Williams

(10) Patent No.: US 8,840,162 B1
(45) Date of Patent: Sep. 23, 2014

(54) CORD MANAGEMENT SYSTEM

(71) Applicant: Othell T. Williams, Jacksonville, AR (US)

(72) Inventor: Othell T. Williams, Jacksonville, AR (US)

( * ) Notice: Subject to any disclaimer, the term of this patent is extended or adjusted under 35 U.S.C. 154(b) by 25 days.

(21) Appl. No.: 13/837,482

(22) Filed: Mar. 15, 2013

(51) Int. Cl.
*A45F 5/00* (2006.01)
*B65H 75/02* (2006.01)

(52) U.S. Cl.
CPC ..................................... *B65H 75/02* (2013.01)
USPC ............................ 294/160; 294/143; 294/167

(58) Field of Classification Search
CPC ................ F16L 3/12; F16L 3/01; F16L 3/13; A45F 5/00; A45F 5/10; A45F 2005/1033; B65D 21/0204
USPC ......... 294/143, 148, 159, 160, 162, 163, 165, 294/166, 167, 168; 211/26.2; 248/49, 65, 248/68.1, 74.1, 74.2
See application file for complete search history.

(56) References Cited

U.S. PATENT DOCUMENTS

| | | | |
|---|---|---|---|
| 3,136,515 A | 6/1964 | Potruch | |
| 3,225,940 A | 12/1965 | Story | |
| 3,317,055 A * | 5/1967 | Roscicki | 211/124 |
| 4,190,182 A * | 2/1980 | Hickey | 294/147 |
| 5,022,614 A * | 6/1991 | Rinderer | 248/62 |
| 6,401,305 B1 | 6/2002 | Joseph | |
| 6,523,229 B2 | 2/2003 | Severson | |
| 6,679,461 B1 * | 1/2004 | Hawkins | 248/74.2 |
| 6,719,158 B2 | 4/2004 | Goldberg | |
| 7,446,260 B2 | 11/2008 | Hammonds | |
| 7,909,186 B1 | 3/2011 | Contreras | |
| 8,413,933 B2 * | 4/2013 | Benne et al. | 248/62 |
| 2002/0000498 A1 * | 1/2002 | Workman | 248/62 |
| 2009/0272856 A1 * | 11/2009 | Azuma et al. | 248/73 |
| 2014/0097304 A1 * | 4/2014 | Mastro | 248/73 |
| 2014/0125075 A1 * | 5/2014 | Xiques | 294/143 |

* cited by examiner

*Primary Examiner* — Saul Rodriguez
*Assistant Examiner* — Gabriela Puig
(74) *Attorney, Agent, or Firm* — Joe D. Calhoun

(57) ABSTRACT

A cord management system having a plurality of holders attached along the length of a cord or cable, with the holders insertable into a housing for storing the cord and for easily accessing either end of the cord without unwinding or tangling the cord.

19 Claims, 6 Drawing Sheets

CORD MANAGEMENT SYSTEM

CROSS-REFERENCE TO RELATED APPLICATIONS

Not applicable.

FEDERALLY SPONSORED RESEARCH AND DEVELOPMENT

Not applicable.

BACKGROUND OF THE INVENTION (1) Field of the Invention

The Invention generally relates to a cord management system for storing a cord (or cable), for attaching along the length of a cord or cable for accessing either end of the cord, and for preventing tangling of the cord.

(2) Description of the Related Art Including Disclosed 37 CFR 1.97 and 1.98

It is often a challenge to store and use cord (or cable) without tangling the length and ends of the cord. It is also a challenge to access either end of the cord once it has been placed or stored in a management system, such as a spool, wrap or winding systems, because at least one end of the cord must be untangled and unwound. These systems do not effectively allow access to either end of the cord without first unwinding and tangling all or a predominant portion of the cord.

U.S. Pat. No. 3,136,515 issued to Potruch discloses a hanger for wires or cables, with the hanger comprising a U-shaped body portion having leg portions joined at one end by a web portion and at the other end molded to a substantially circular wire support band having two slots or openings. Near the U-shaped body portion is a circular band for holding the wires. To operate, the hanger is spread apart at one of the slots and a support bar is slid past that slot and into a circular band. With a plurality of hangers mounted on the support bar, which spans the length along which the wires are to be supported, the wires are inserted into the band through the slot.

U.S. Pat. No. 6,523,229 issued to Severson discloses a cord keeper strap including a strap having a plurality of holes spaced apart along the length of the strap, with each hole designed to accept a button fastener. The button fastener includes a head and shank that are inserted through the hole. The strap is wrapped one or more times around the cord bundle and fastened.

U.S. Pat. No. 6,719,158 issued to Goldberg discloses a clothing support assembly having formed channels, a wheeled truck assembly, and a support. The formed channel includes side walls, a roof, laterally spaced tracks, and vertical walls. The side walls are connected to the support roof, with the side walls forming a slot. Laterally spaced tracks are formed between the side walls and vertical walls. The slot is wide enough to permit wheeled truck assembly to move back and forth. The wheeled truck assembly includes wheels, bearings slotted hooks having a top body portion having openings, and a bottom portion for receiving the clothes hangers.

U.S. Pat. No. 7,909,186 issued to Contreras discloses a clothes hanger apparatus including a horizontal tube having a slot at the bottom of the tube, with the slot spanning throughout the length of the tube. A plurality of roller assemblies is removably fitted within the tube. Each roller assembly includes female semispherical member having an outer perimeter taper and a corresponding male semispherical also having an outer perimeter taper. A roller assembly is attached to each hanger for rolling or sliding within the tube.

None of these expressly discloses a cord management system for accessing either end of the cord (or cable) and for storing the cord, the cord management system comprising a plurality of holders, with each holder having a clamping member for enclosing a cord and a sliding member for sliding the holder within a housing; the housing having a handle, two side walls each having at least one receiving hole, at least one open-ended end wall, a slot along the length of the bottom of the housing, and a channel for housing the holders; and at least one stop member for preventing the holders from inadvertently sliding out of the open end of an end wall of the housing.

SUMMARY OF THE INVENTION

The Invention is essentially a portable cord management system comprising (including or having) (1) a housing having a top plate having a handle, two opposing side walls with each side wall having at least two receiving holes each for receiving a stopping member, a base having an opening (or slot) spanning the length of the base, at least one open-ended end wall, and a channel for receiving one or more holders; and (2) a plurality of holders, with each holder having a clamping member for attaching onto a cord (or cable) and a sliding member for sliding the holder within the housing. The cord management system will allow one to access either end of the cord without first unwinding or untangling the cord. The holders may be permanently attached to the cord along the length of the cord, or they may be removably attached and reused.

It is an object of the present invention to provide a portable cord management system having a plurality of holders for attaching along the length of a cord or cable, with the holders slidably housed within a housing, for accessing either end of the cord.

Other objects will be apparent from a reading of the written description disclosed herein, together with the claims.

Figure 10:
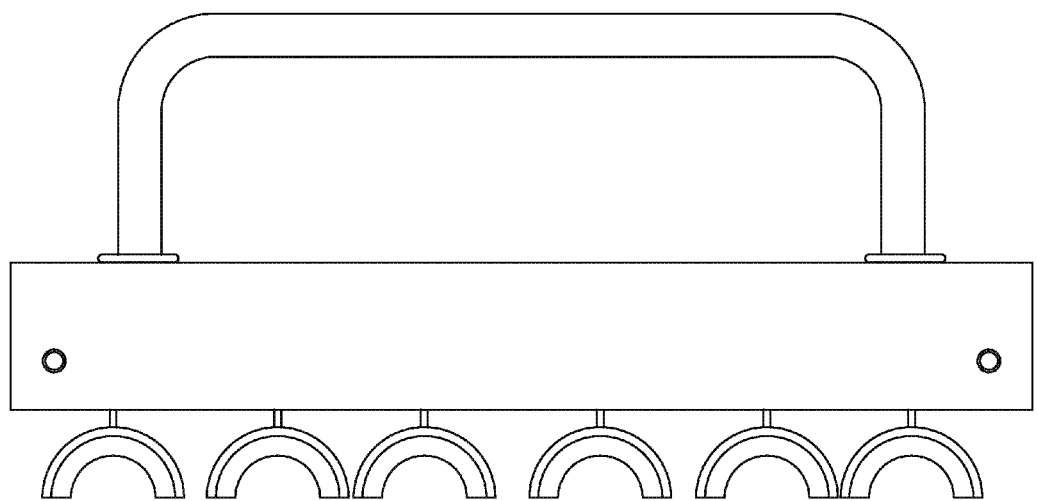
FIG. 10 is a rear elevation view of FIGS. 1 and 7 thereof.

The broken lines showing the cord or cable is for illustrative purposes only, and do not form part of the claimed invention. All remaining views of the holders having a cylindrical sliding member configuration are the same as FIGS. 1, 2, 4, and 6. The rear elevation view of the embodiment of the holder having a semi-circular ball-shaped sliding member configuration is the same view as FIG. 10.

DETAILED DESCRIPTION OF THE INVENTION

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural and/or functional requirements.

Although the present invention has several embodiments, one preferred embodiment is a portable cord management system for use along the length of a cord or cable for accessing either end of the cord and for preventing tangling of the cord, the cord management system comprising (including or having):

a. a plurality of holders, each of the holders including a clamping member for attaching along the length of the cord and a sliding member for slidably traveling within a housing;

b. a housing including a top having a handle, two opposing side walls with each of the side walls having at least one receiving hole, a bottom having a slot extending the length of the housing, at least one open-ended end wall, and a channel; and c. at least one stop member insertable into the receiving hole in each of the opposing the side walls for preventing the holders from inadvertently sliding out of the open end of the end wall.

Another embodiment of the invention is a portable cord management system for use along the length of a cord or cable for accessing either end of the cord and for preventing tangling of the cord, the cord management system comprising:

(1) a plurality of holders, each of the holders including a clamping member having a clamp for attaching along the length of the cord and a flexible, upstanding support member mounted to the top of the clamp, and a sliding member for sliding the holder within a housing, the sliding member mounted onto the top of the support member;

(2) a housing including a top having a handle, two opposing side walls with each of the side walls having at least two receiving holes, a bottom having a central slot extending along the length of the housing and two longitudinal flanges for supporting each of the holders, open-ended front and rear end walls, and a channel having a width larger than the sliding members; and (3) at least two stop members, each insertable into the respective the receiving holes in the side walls for preventing the holders from inadvertently sliding out of either end walls of the housing.

The housing 1 may be made from a material selected from the group consisting of woods, plastics, polymers, metals, and combinations thereof. The housing 1 may be one continuous, integrated component having a top, two opposing side walls, open-ended front and rear end walls, a bottom having a central slot 4, and an open-ended channel 5. The housing 1 may be any size, shape, or length suitable for containing the plurality of holders 7 and for supporting the weight of the cord. As shown in FIGS. 1, 3-6, and 9-11, the housing 1 in substantially the shape of a rectangle is preferred. The length and overall size of the housing may depend upon the number and size of the holders to be inserted, as well as needed to support for storing the overall estimated weight the cord.

Each side wall includes at least one receiving hole, preferably at least two receiving holes 2 (or apertures), each for receiving a stop member. (FIGS. 1-2, 5-6, and 10-11) Each hole 2 is positioned near each end of the side wall. The two receiving holes 2 of a first side wall align with the corresponding two receiving holes 2 of a second side wall. The stop members (or retainers) prevent the holders 7 from falling out either open end of the housing 1. A first stop member 3 is inserted through the two corresponding left receiving holes 2, and a second stop member 3 is inserted through the two corresponding right receiving holes 2. In one embodiment, each stop member 3 includes a rod and a flexible loop, with one end of the loop attached to the top of the rod and the opposite end attached to the vertical bar of the handle 6.

The bottom (or base) of the housing 1 includes a central slot 4 (or opening) extending along the length of the bottom of the housing 1, and a flange on each side of the slot 4. (FIGS. 1-2, 5, and 11). The holders 7 freely slide or travel along the length of the slot 4, with the bottom of each sliding member 9 abutting the top of the flanges. The flanges also keep the sliding members 9 from falling downwardly out of the housing 1. The slot 4 should be wider than the width of the upstanding support member 10 of the holder, but should be not be wider than the width of the sliding member 9. The open-ended channel 5 extends along the length of the housing 1. The channel 5 is easily accessible from either end wall for inserting the holders 7. The channel should have a width great than the sliding member 9.

The handle 6 is connected to or otherwise permanently mounted onto (or into) the top of the housing 1. The handle may be made from materials selected from the group consisting of metals, plastics, polymers, and combinations thereof. The handle should be of a sufficient strength and durability for carrying, using, or storing the cord management system. The handle may be further used to store the housing on a hanging means, for example, on a hook on a wall. In a preferred embodiment shown in FIG. 1, the handle 6 has a horizontal bar and two vertical bars, each vertical bar extending downwardly from the opposing ends of the horizontal bar. The corners of the handle 6 may be contoured or rounded not only for an aesthetic look, but also for user comfort.

Figure 1:
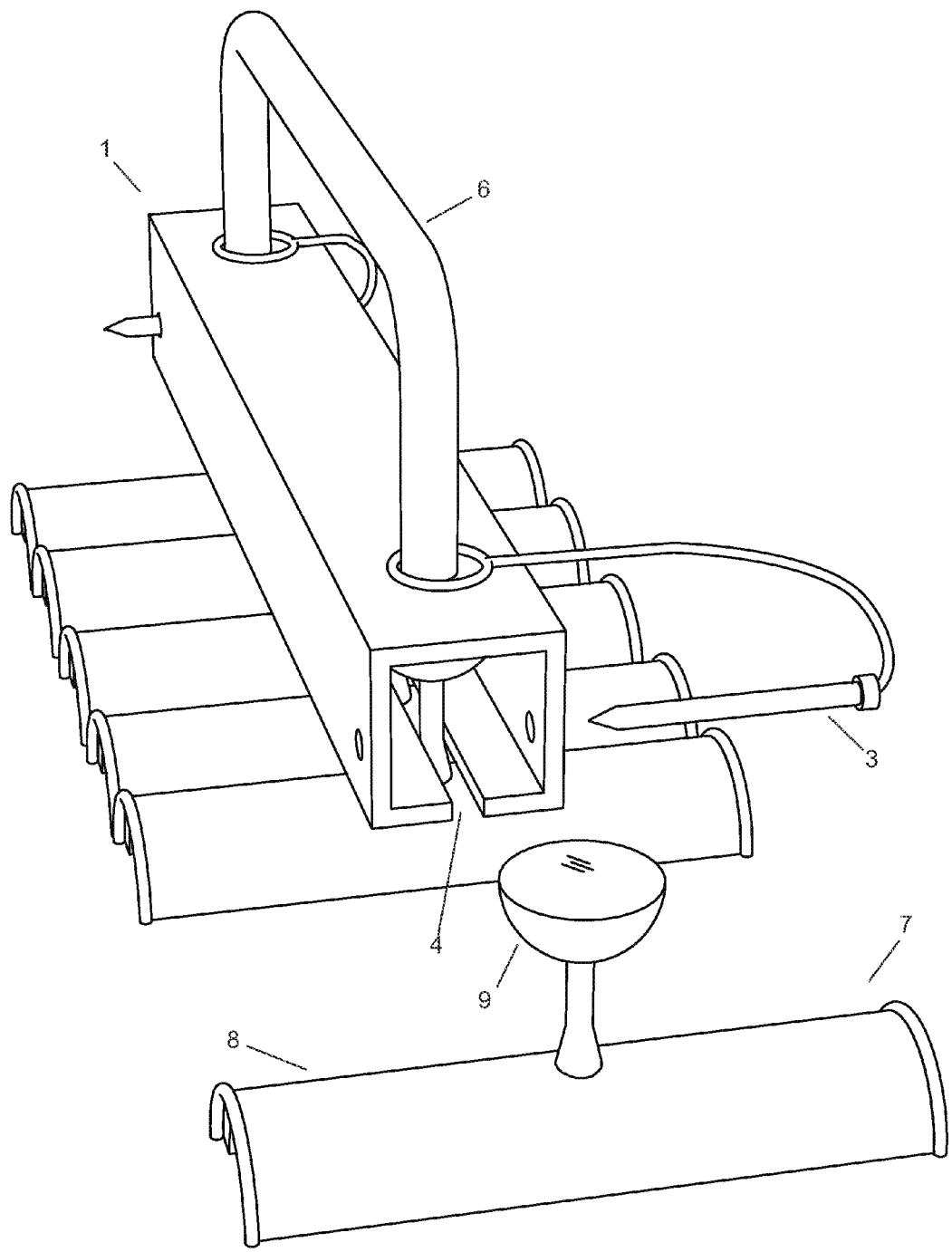
FIG. 1 is a perspective view of one embodiment of the cord management system, with one of the holders removed from the housing for clarity, with the holders having a semi-circular ball-shaped sliding member configuration.
Figure 2:
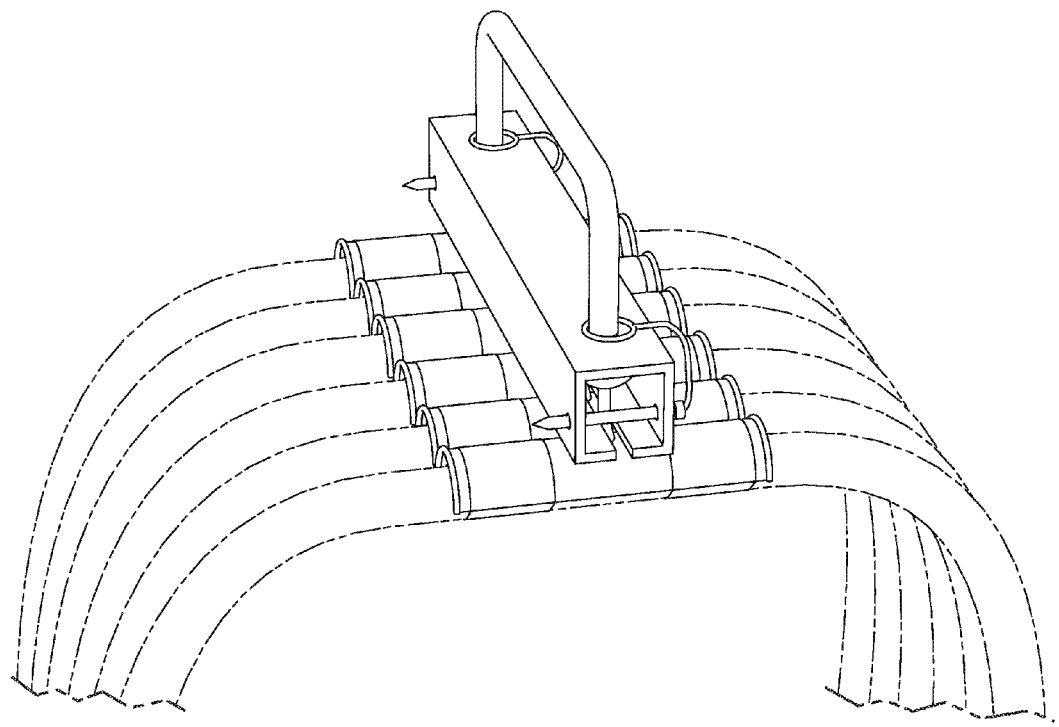
FIG. 2 is another perspective view of FIG. 1 thereof, with a plurality of holders attached along the length of the cord and inserted into the housing, with the stop members inserted through the each side walls' receiving holes, and with the cord shown in broken lines.
Figure 3:
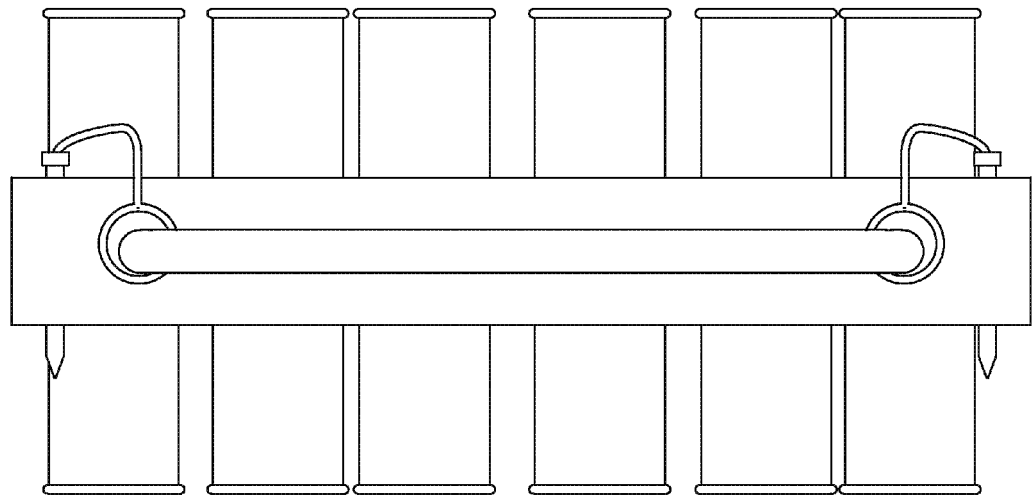
FIG. 3 is a top plan view of FIG. 1 thereof, with the plurality of holders inserted into the housing and the two stop members inserted into the receiving holes.
Figure 4:
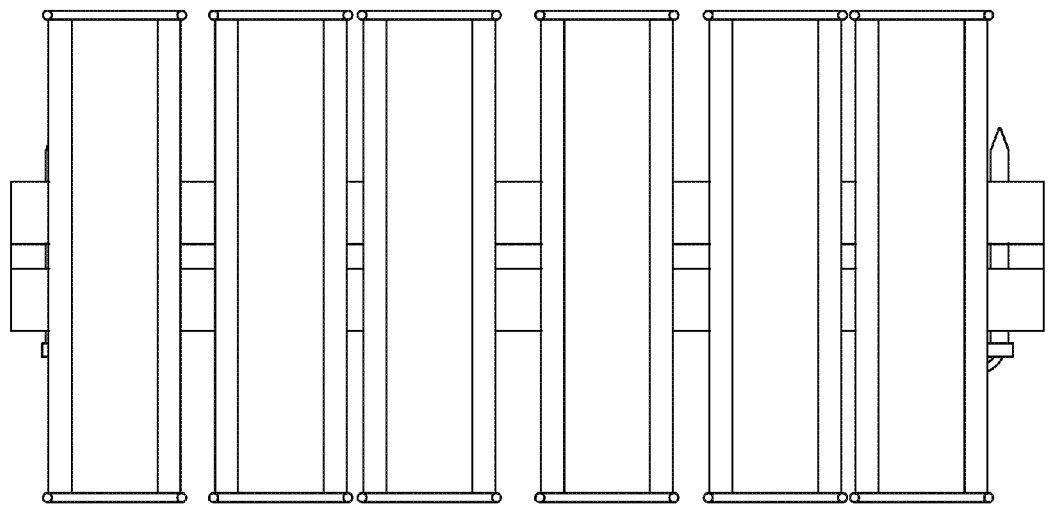
FIG. 4 is a bottom plan view of FIG. 1 thereof.
Figure 5:
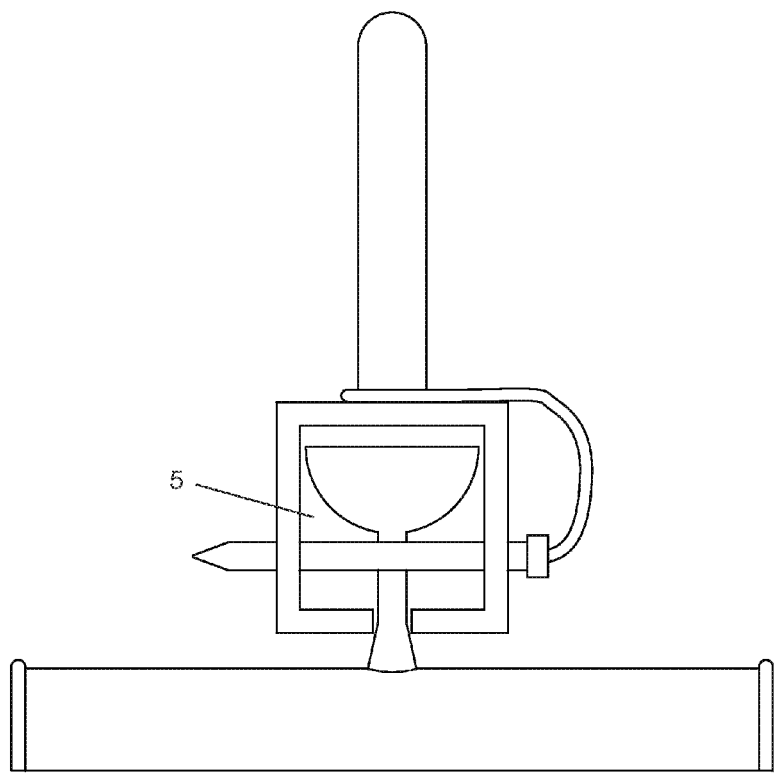
FIG. 5 is a left side elevation view of FIG. 1 thereof, with the right side elevation view being a mirror image of the left side elevation view.
Figure 6:
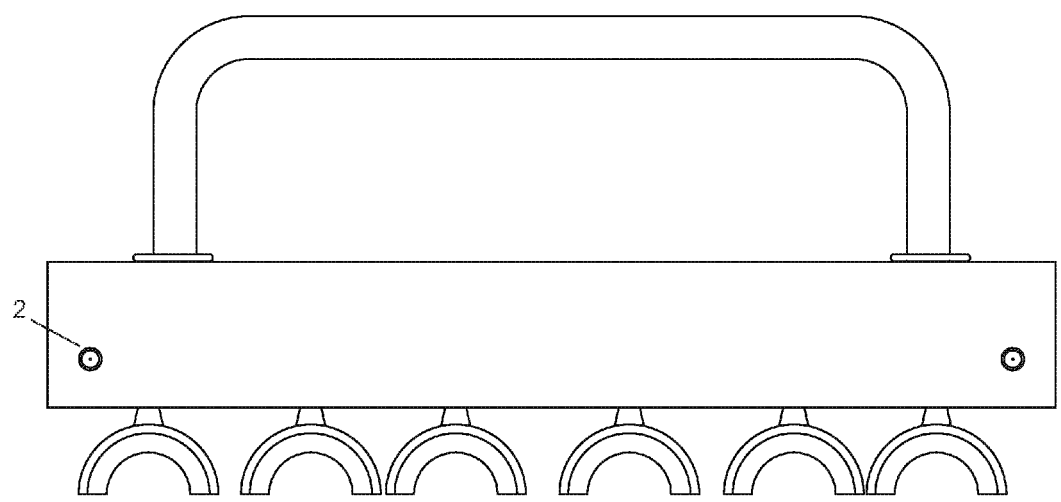
FIG. 6 is a front elevation view of FIGS. 1 and 8 thereof.
Figure 7:
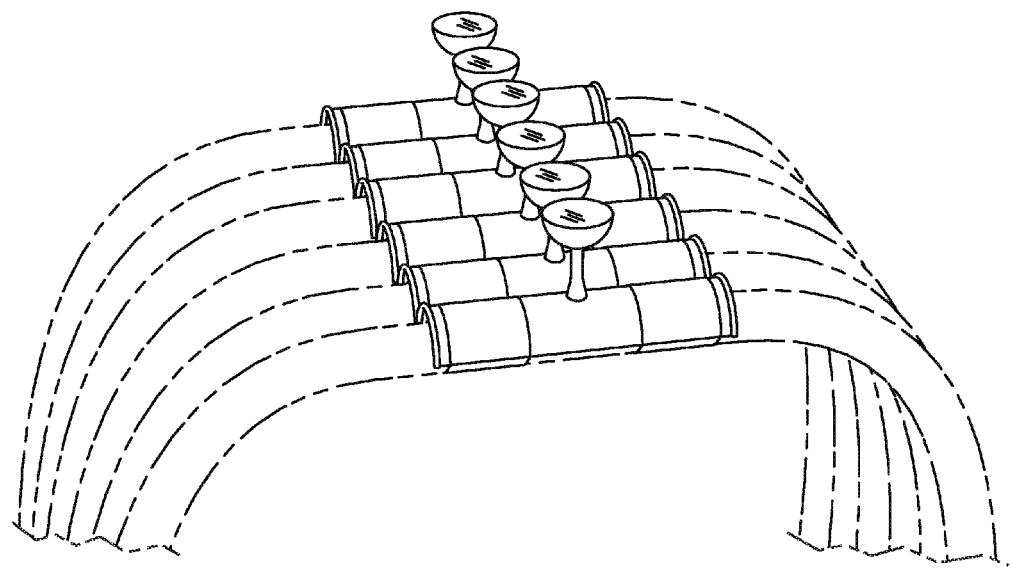
FIG. 7 is another perspective view of FIG. 1 of the plurality of holders attached along the length of the cord and before placement into the housing.
Figure 8:
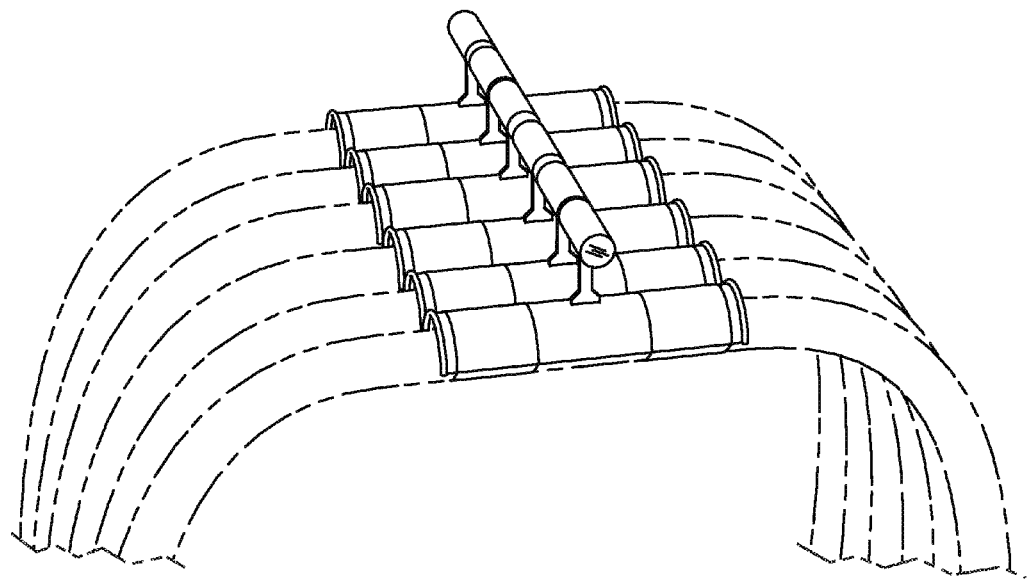
FIG. 8 is a perspective view of an alternative embodiment of FIG. 1, with the plurality of holders having a cylindrical sliding member configuration, with the holders attached along the length of the cord and before placement into the housing.
Figure 9:
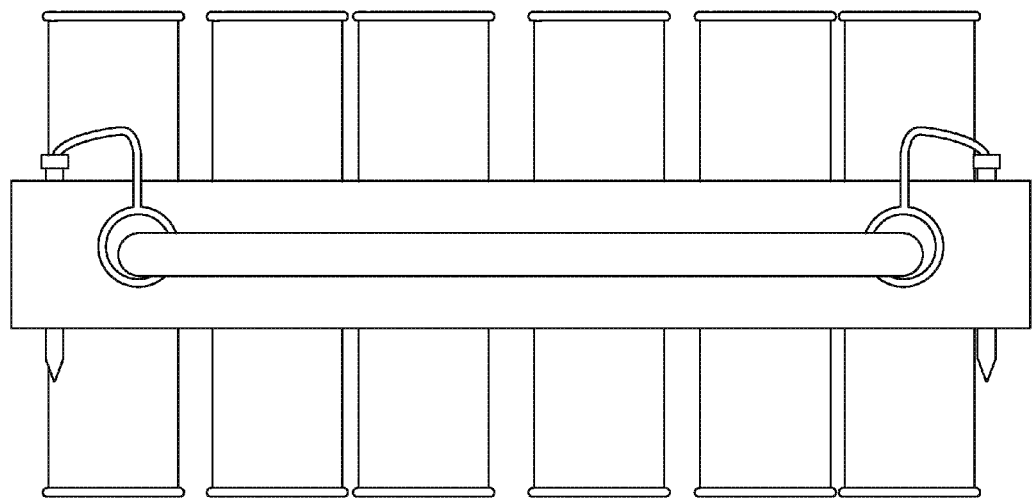
FIG. 9 is a top plan view of FIG. 8 thereof, with the plurality of holders inserted into the housing and the two stop members inserted into the receiving holes.
Figure 11:
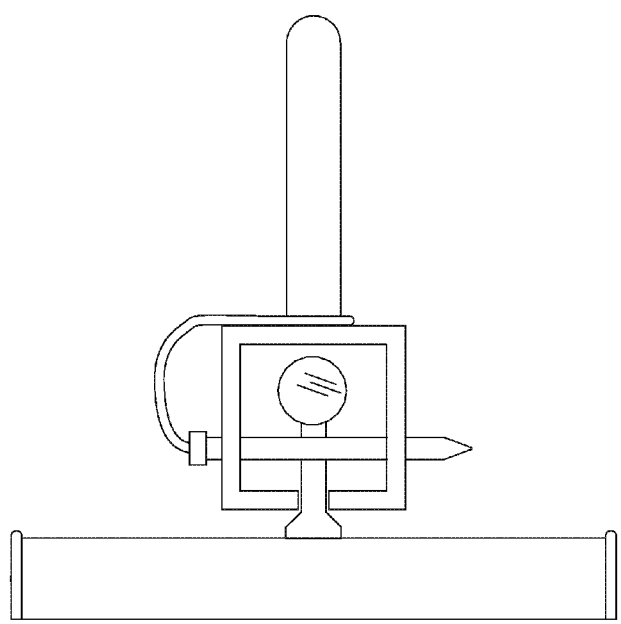
FIG. 11 is right side elevation view of FIG. 7, with the left side elevation view being a mirror image of the right side elevation view.

A plurality of holders 7 may be attached along the length of the cord, as shown in FIGS. 2, 7 and 8. The holder may be made from a material selected from the group consisting of plastics, polymers, rubbers, and combinations thereof. The holders are preferably waterproof and durable. Each holder 7 includes a clamping member 8 and a sliding member 9, as shown in FIG. 1, wherein the holder 7 has been removed from the housing 1. Once inserted into the housing 1, either end of the cord is accessible, as shown in FIGS. 5 and 11.

Each clamping member 8 includes a flexible clamp (or clip) for clamping, covering, or wrapping around a segment of the length of the cord. Each clamping member may be permanently attached to the cord. For example, the clamping members may be glued along the length of the cord. Alternatively, each clamping member may be retrofitted and temporarily attached to an existing cord and may be reused. For example, the clamping members may be taped or clipped along the length of the cord. The clamping members 8 may be spaced along the length of the cord, preferably every 72 inches. Each clamping member 8 may further include a flexible, upstanding support member 10 connected to the sliding member 9. The width of the support member 10 should be smaller than the width of the slot 4. The support member 10 aids in the holder 7 slidably travelling within the channel 5.

The sliding member 9 is slidably inserted through channel 5 at either front or rear end walls. The bottom portion of the sliding member 9 rests against and travels along the flanges of the bottom of the housing 1. The diameter of the sliding member 9 should be approximately the same as that of a standard electric cord, extension cord or other cable, although other diameters are available. Preferably, the diameter of the sliding member is approximately 0.31 inches. The sliding members may be made from polymers, plastics, or any other flexible, durable materials. The sliding members may have any shape or configuration and includes without limitation, semi-circular ball-member, circular ball-member, bell-shaped member, and cylindrical-shaped member. In one embodiment, a semi-circular ball-shaped member is preferred as shown in FIGS. 1-2 5, and 7. Alternatively, the sliding member 9 has a cylindrical shaped configuration as shown in FIGS. 8 and 11. Also, when the embodiment of the holder 7 includes the upstanding support member 10, the bottom of the sliding member 9 is mounted on top of the support member 10, as best shown in FIG. 1.

The method of using the cord management system for accessing either end of a cord and for storing a cord, with the method comprising the steps of:

1. attaching a plurality of the holders along the length of the cord;
2. removing the stop member from the receiving hole in the side wall, slidably inserting each of the holders into the channel of the housing, and re-inserting the stop member into the receiving hole; and
3. pulling one or both ends of the cord, stretching the length of the cord without tangling.

Once installed, the cord management system may be stored in a substantially upright position, for example, on a garage wall or other workspace. The cord is essentially loosely looped and organized within the housing. When in use, the user holds the handle with one hand and connects one end of the cord to an outlet receptacle. The other end of the cord may be accessed easily without the need to unwind and/or untangle the entire cord. The cord is not tangled in this system because the ends of the cord do not intertwine within the loops in the cord. The cord may be an electrical cord or other flexible cable capable of being looped or wrapped upon itself.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A cord management system for attaching along the length of a cord or cable for accessing either end of the cord and for preventing tangling of the cord, the cord management system comprising:
    a. a plurality of holders, each of said holders including a clamping member for attaching along the length of the cord and a sliding member for slidably traveling within a housing;
    b. the housing including a top having a handle, two opposing side walls with each of said side walls having at least one receiving hole, a bottom having a slot extending the length of said housing, at least one open-ended end wall, and a channel; and
    c. at least one stop member insertable into said receiving hole in each of the opposing said side walls for preventing said holders from inadvertently sliding out of the open end of said end wall.

2. The cord management system of claim 1, said slot on the bottom of said housing being formed from the spacing between a pair of flanges, said flanges supporting the underside of said sliding members of said holders within said channel.

3. The cord management system of claim 1, said housing further comprising a second open-ended end wall, opposite the at least one open-ended end wall, said holders insertable through either of said end walls.

4. The cord management system of claim 1, said clamping member comprising a flexible clamp for clamping around a segment of a length of the cord.

5. The cord management system of claim 4, a plurality of said clamping members permanently affixed along the length of the cord.

6. The cord management system of claim 4, a plurality of said clamping members removably attached along the length of the cord.

7. The cord management system of claim 4, said clamping member further comprising a flexible, upstanding support member being mounted to the top of said clamp and to the bottom of said sliding member, said support member having a width smaller than the width of said slot in the bottom of said housing.

8. The cord management system of claim 1, said sliding member having a width smaller than the width of said channel for ease in insertion and travelling within said housing.

9. The cord management system of claim 1, said sliding member comprising any effective shape or configuration selected from the group consisting of a semi-circular ball-member, a circular ball-member, a bell-shaped member, a cylindrical-shaped member, and combinations thereof.

10. The cord management system of claim 9, said sliding member comprising a semi-circular ball-shaped member.

11. The cord management system of claim 9, said sliding member comprising a cylindrical-shaped member.

12. A method of using a cord management system of claim 1 on a cord or cable for accessing either end of the cord and for preventing tangling of the cord, said method comprising the steps of:
    a. attaching a plurality of said holders along the length of the cord;
    b. removing said stop member from said receiving hole in said side wall, slidably inserting each of said holders into said channel of said housing, and re-inserting said stop member into said receiving hole; and
    c. pulling one or both ends of the cord, stretching the length of the cord without tangling.

13. A cord management system for use along the length of a cord or cable for accessing either end of the cord and for preventing tangling of the cord, the cord management system comprising:
  a. a plurality of holders, each of said holders including a clamping member having a clamp for attaching along the length of the cord and a flexible, upstanding support member mounted to the top of said clamp, and a sliding member for sliding said holder within a housing, said sliding member mounted onto the top of said support member;
  b. the housing including a top having a handle, two opposing side walls with each of said side walls having at least two receiving holes, a bottom having a central slot extending along the length of said housing and two longitudinal flanges for supporting each of said holders, open-ended front and rear end walls, and a channel having a width larger than said sliding members; and
  c. at least two stop members, each insertable into the respective said receiving holes in said side walls for preventing said holders from inadvertently sliding out of either end walls of said housing.

14. The cord management system of claim 13, a plurality of said clamping members permanently affixed along the length of the cord.

15. The cord management system of claim 13, a plurality of said clamping members removably attached along the length of the cord.

16. The cord management system of claim 13, said sliding member having a width smaller than the width of said channel for ease in insertion and travelling within said housing.

17. The cord management system of claim 13, said sliding member comprising any effective shape or configuration selected from the group consisting of a semi-circular ball-member, a circular ball-member, a bell-shaped member, a cylindrical-shaped member, and combinations thereof.

18. The cord management system of claim 17, said sliding member comprising semi-circular ball-shaped member.

19. The cord management system of claim 17, said sliding member comprising a cylindrical-shaped member.

* * * * *